(12) United States Patent
Musser

(10) Patent No.: US 8,403,101 B2
(45) Date of Patent: Mar. 26, 2013

(54) USER INTERFACE FOR ENERGY SOURCES ON A HYBRID VEHICLE

(75) Inventor: James William Musser, Charlotte, NC (US)

(73) Assignee: Deere & Company, Moline, IL (US)

(*) Notice: Subject to any disclaimer, the term of this patent is extended or adjusted under 35 U.S.C. 154(b) by 189 days.

(21) Appl. No.: 12/882,450

(22) Filed: Sep. 15, 2010

(65) Prior Publication Data

US 2012/0061163 A1 Mar. 15, 2012

(51) Int. Cl.
*B60K 26/00* (2006.01)
(52) U.S. Cl. .................. 180/334; 180/333; 180/335
(58) Field of Classification Search ............ 180/333, 180/334, 335; 701/52, 53, 54
See application file for complete search history.

(56) References Cited

U.S. PATENT DOCUMENTS

| | | | |
|---|---|---|---|
| 4,099,589 A | 7/1978 | Williams | |
| 4,351,405 A * | 9/1982 | Fields et al. | 180/65.225 |
| 5,318,142 A * | 6/1994 | Bates et al. | 180/65.245 |
| 5,492,190 A | 2/1996 | Yoshida | |
| 5,566,774 A | 10/1996 | Yoshida | |
| 5,786,640 A | 7/1998 | Sakai et al. | |
| 5,842,534 A | 12/1998 | Frank | |
| 6,116,363 A | 9/2000 | Frank | |
| 6,207,894 B1 * | 3/2001 | Reiker | 174/503 |
| 6,230,496 B1 | 5/2001 | Hofmann et al. | |
| 6,242,873 B1 | 6/2001 | Drozdz et al. | |
| 6,271,645 B1 | 8/2001 | Schneider et al. | |
| 6,333,620 B1 | 12/2001 | Schmitz et al. | |
| 6,356,083 B1 | 3/2002 | Ying | |
| 6,359,419 B1 | 3/2002 | Verbrugge et al. | |
| 6,488,608 B2 * | 12/2002 | Yamaguchi et al. | 477/3 |
| 6,608,482 B2 | 8/2003 | Sakai et al. | |
| 6,644,427 B2 * | 11/2003 | Schulte | 180/65.25 |
| 6,653,817 B2 | 11/2003 | Tate, Jr. et al. | |
| 6,722,457 B2 | 4/2004 | Yamaguchi et al. | |
| 6,832,148 B1 | 12/2004 | Bennett et al. | |
| 6,841,972 B2 | 1/2005 | Koo | |
| 6,868,926 B2 | 3/2005 | Boggs et al. | |
| 6,877,576 B2 * | 4/2005 | Wilton et al. | 180/65.245 |
| 6,909,200 B2 | 6/2005 | Bouchon | |
| 7,013,205 B1 | 3/2006 | Hafner et al. | |
| 7,049,792 B2 | 5/2006 | King | |
| 7,091,839 B2 | 8/2006 | Situ et al. | |
| 7,233,128 B2 | 6/2007 | Brost et al. | |
| 7,340,859 B2 * | 3/2008 | Palsrok | 47/39 |
| 7,490,000 B2 | 2/2009 | Siddiqui et al. | |
| 7,497,285 B1 * | 3/2009 | Radev | 180/65.225 |
| 7,563,193 B2 | 7/2009 | Tenbrock et al. | |
| 7,628,236 B1 * | 12/2009 | Brown | 180/65.21 |

(Continued)

OTHER PUBLICATIONS

State of Charge (SOC) Determination. Electropaedia. Battery and Energy Technologies. [online]. Retrieved from the Internet: <URL: http://www.mpoweruk.com/soc.htm>.

*Primary Examiner* — J. Allen Shriver, II
*Assistant Examiner* — James Triggs

(57) ABSTRACT

A user interface for managing energy from multiple energy sources on a hybrid vehicle displays information on the amount of energy available from a battery pack and liquid fuel tank, and allows the user to select when and how much stored energy is used from each energy source. The user interface may include an operator actuated control and a pair of gauges showing the amount of stored energy for the battery pack and the liquid fuel tank. The operator control may move the control between end settings that disable the internal combustion engine or minimize battery pack use.

14 Claims, 1 Drawing Sheet

U.S. PATENT DOCUMENTS

| | | | |
|---|---|---|---|
| 7,857,082 B2 * | 12/2010 | Gray, Jr. | 180/65.28 |
| 8,073,601 B2 * | 12/2011 | Heap et al. | 701/54 |
| 8,082,774 B2 * | 12/2011 | Watson et al. | 73/114.54 |
| 2004/0168420 A1 * | 9/2004 | Fillman et al. | 56/10.6 |
| 2007/0213891 A1 * | 9/2007 | Musser | 701/22 |
| 2009/0250277 A1 * | 10/2009 | Grand et al. | 180/65.265 |
| 2009/0294191 A1 * | 12/2009 | Sheidler et al. | 180/65.31 |
| 2011/0246005 A1 * | 10/2011 | King et al. | 701/22 |
| 2012/0061163 A1 * | 3/2012 | Musser | 180/333 |

\* cited by examiner

USER INTERFACE FOR ENERGY SOURCES ON A HYBRID VEHICLE

FIELD OF THE INVENTION

The present invention relates to a user interface for managing multiple energy sources on vehicles such as plug-in and extended range hybrid electric vehicles.

BACKGROUND OF THE INVENTION

Plug-in or extended range hybrid electric vehicles may include one or more electric traction drive motors powered by an engine-driven generator and/or storage battery. Extended range electric vehicles should include sufficient electrical energy storage to provide full vehicle driving performance for a desired time or distance without operating the internal combustion engine. If a hybrid vehicle is operated solely from the energy stored within the storage battery or similar device, it should be quiet and should not consume fuel or emit exhaust. After the electrical energy stored in the battery is consumed, the hybrid vehicle may continue operation with the support of the power generated by the internal combustion engine. However, the operator may have little or no control or information about the choice of energy sources or the rate at which each energy source is depleted.

A user interface for energy sources on such a hybrid vehicle is needed that will provide information on the amount of energy available from both a battery pack and a liquid fuel tank, and allow the operator to select when and how much stored energy is used from each energy source.

SUMMARY OF THE INVENTION

A user interface for energy sources on a hybrid vehicle displays information on the amount of energy available from a battery pack and a liquid fuel tank, and allows the user to select when and how much energy is used from each energy source. The user interface may include an operator actuated control that may directly or indirectly change the position of an engine throttle to vary the engine speed and resulting generator power. The operator control also may have one or more end settings to turn off or disable either of the internal combustion engine or battery pack.

DESCRIPTION OF THE PREFERRED EMBODIMENT

Figure 1:
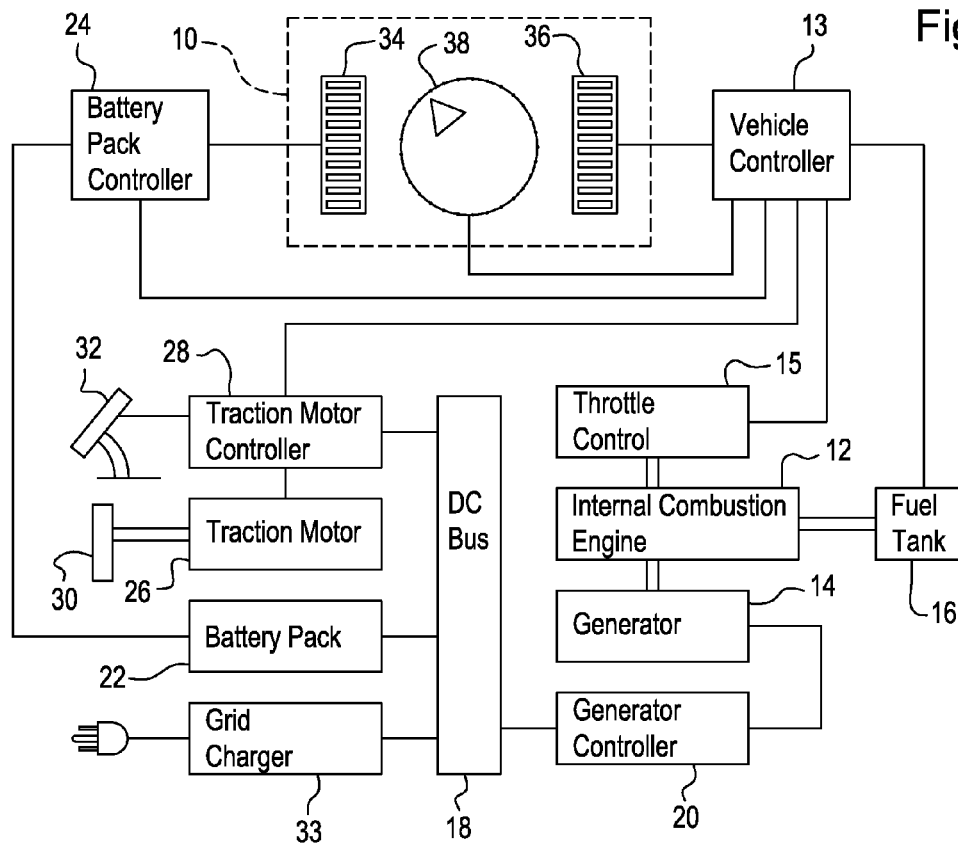
FIG. 1 is a schematic representation of a user interface for energy sources on a hybrid vehicle according to one embodiment of the invention.
Figure 2:
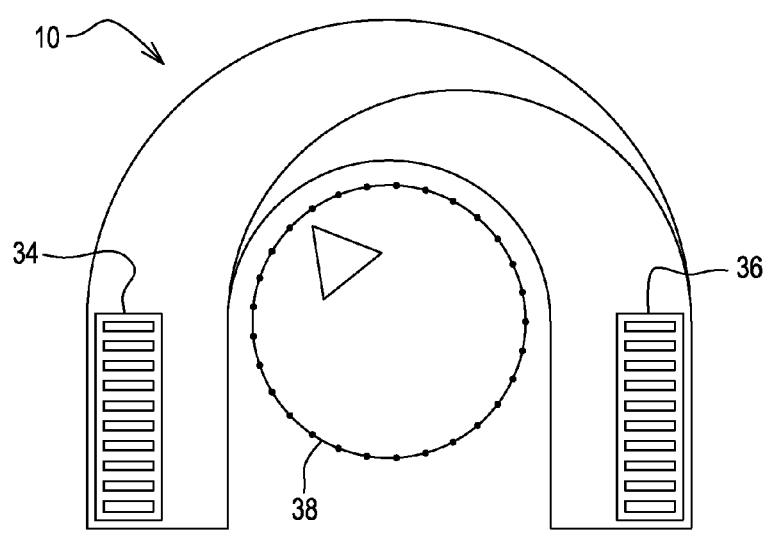
FIG. 2 is a top view of a user interface for energy sources on a hybrid vehicle according to a preferred embodiment.

As shown in FIG. 1, a hybrid vehicle such as a utility vehicle, tractor, or lawn tractor, may have a traction drive including internal combustion engine 12 connected to generator or alternator 14 with a belt drive, for example. The generator or alternator may be electrically connected to generator controller 20, which also may be connected to DC bus 18. Throttle control 15 may be connected between the internal combustion engine and vehicle controller 13.

In one embodiment, the traction drive for the hybrid vehicle may include one or more electric traction drive motors 26 which may drive one or more traction drive wheels 30. The traction drive motor(s) may be electrically connected to traction motor controller(s) 28. The traction motor controller(s) also may be connected to operator pedal 32, vehicle controller 13 and DC bus 18. The operator pedal may be used to change the torque or speed of the traction drive motor(s). Optionally, the operator pedal, or other parameters provided to the vehicle controller such as vehicle speed, also may be used to change the speed of the internal combustion engine.

In one embodiment, the hybrid vehicle traction drive may include battery pack 22 electrically connected to battery pack controller 24 and to DC bus 18. The battery pack controller also may be connected to vehicle controller 13, and to battery energy level gauge 34 on user interface 10. The hybrid vehicle also may include grid charger 33 connected to DC bus 18. If the grid charger is connected to the electrical grid, the traction motor may be disabled.

The hybrid vehicle may include fuel tank 16 which may provide a liquid fuel supply to the internal combustion engine. The fuel tank may include a fluid volume or fuel level sensor electrically connected to vehicle controller 13. The vehicle controller may be electrically connected to liquid fuel tank energy level gauge 36 on user interface 10, and also to operator control 38 on the user interface for energy sources.

In one embodiment, user interface 10 also may include battery energy level gauge 34. Each gauge may include LEDs or other graphic display showing the energy levels remaining in each of the fuel tank and battery pack respectively, between a 100% or full condition and a 0% or empty condition. The user interface for energy sources may be provided on the dashboard in the operator station of the vehicle, with an operator control between the battery energy level gauge and the fuel tank energy level gauge.

In one embodiment, battery energy level gauge 34 may be connected to the battery pack controller, and may provide a state of charge estimation expressed as a percentage of the rated capacity of the new battery pack or its actual capacity at any point in the battery pack's life. Preferably, the energy contained in the battery pack may be calculated by measuring the current charging or discharging the battery pack and integrating this over time. For example, the battery pack controller may include a current shunt that continuously determines the current by measuring the voltage drop across a sense resistor, or may include a Hall effect transducer or other sensor to measure current.

In one embodiment, vehicle controller 13 may be programmed with an initialized value provided to the battery pack controller and displayed on battery energy level gauge 34 when the battery pack is first connected to the vehicle. The initial value may be selected as less than the maximum or rated capacity of the battery pack, and so it may be represented as less than 100% or full on the battery energy level gauge. Subsequently, when the battery pack is first charged or discharged, the battery pack controller may update or correct the battery energy level gauge based on actual data.

For example, in one embodiment, the battery pack controller may update or correct the battery energy level gauge to display 100% or full when the battery pack controller senses the battery pack is fully charged. For example, the battery pack may be fully charged using grid charger 33, and the battery pack controller may determine it is fully charged based on the level of charging current or battery pack voltage. Similarly, the battery pack controller may update or correct the battery energy level gauge to display 0% or empty when the battery pack controller senses the battery pack is fully discharged, or when the remaining energy will not support the desired vehicle performance. For example, the battery pack controller may correct the gauge to show 0% or empty when it detects a steep voltage drop at a nominal or reference current. As a result, the battery energy level gauge may accurately represent and display the state of charge of the battery pack between the fully charged and fully discharged conditions, as the battery pack controller may correct the values displayed to reflect both charging or discharging conditions, and battery pack degradation.

In one embodiment, user interface 10 also may include fuel tank energy level gauge 36. The fuel tank energy level gauge may graphically display the amount of energy remaining in the liquid fuel tank, which may correspond to the liquid fuel volume in the tank. For example, the fuel level may be determined using a float that completes a resistive circuit and moves with the fuel level within the tank.

In one embodiment, user interface 10 may include operator control 38 that the operator may use to select between energy sources including a battery-only mode, a maximum internal combustion engine mode, and various intermediate positions based on the amount of energy to be consumed from each energy source. For example, the operator control may be a dial or slide control actuated by the operator from the dashboard or operator station of the vehicle. The operator may turn or slide operator control 38 all the way in a first direction to a first end setting designated as the battery-only mode. In the battery-only mode the operator control may point to, or be positioned next to, the battery energy level gauge. The battery-only mode will cause the battery pack to be the only energy source used to operate traction motor(s) 26. If the operator places control 38 in the battery-only mode, he or she may disable the internal combustion engine so that the engine will not start or run. For example, placing control 38 in the battery-only mode may trigger a relay that will ground the ignition circuit of the internal combustion engine.

In one embodiment, while the vehicle is in battery-only mode, the vehicle controller may be programmed to change vehicle pedal performance as a function of the state of charge of the battery pack. Pedal performance means the torque response of a wheel or traction motor to pedal movement or pedal position. When the battery pack is fully charged, the traction motors may have relatively high torque for each pedal position. As the battery pack is discharged, the traction motors may have lower torque for the same pedal positions. As the battery pack state of charge decreases, the traction motor(s) can draw less current from the battery and may have lower torque.

In one embodiment, the operator may turn or slide operator control 38 in a second direction away from the battery-only mode position to start the internal combustion engine. For example, the operator may move control 38 away from the battery-only mode, causing the vehicle controller to start the engine and move the throttle to a position to run the engine at a specified speed, which may be an idle speed. Optionally, the operator may use control 38 to set the maximum speed of the engine, and use the operator pedal to change the engine speed between an idle speed and maximum speed.

In one embodiment, the operator may move control 38 further away from the battery-only mode and toward the maximum internal combustion engine mode to increase the maximum speed of the internal combustion engine. If the operator moves control 38 to increase the engine speed, the generator may provide more power to the traction motor(s) and/or battery pack. If the traction drive controller draws more power than is provided by the generator, the traction drive also may draw power from the battery pack. If the traction drive controller draws less power than is provided by generator, the remainder of the power from the generator will go into charging the battery pack. Optionally, if the operator moves the control toward the maximum internal combustion engine mode, he or she may increase the maximum speed of the engine, and the operator also may use the pedal to change the speed between an idle speed and the maximum speed.

In one embodiment, the operator may turn or slide operator control 38 all the way in the second direction to a second end setting designated as the maximum internal combustion engine mode. For example, the operator may move the control so that it points to, or is positioned next to, the fuel energy level gauge. If the operator moves the control to the maximum internal combustion engine mode, the internal combustion engine will be the primary energy source used to operate traction motor 26, and energy from the battery pack is minimized for the traction drive(s). The internal combustion engine may run at a maximum speed, and so long as the traction drive controller draws less power than is provided by generator, the generator will charge the battery pack. Optionally, when the operator moves control 38 to the maximum internal combustion engine mode, the operator also may use the pedal to change the engine speed between an idle speed and the maximum speed.

In one embodiment, operator control 38 may provide a continuum or plurality of positions between the battery-only mode and maximum internal combustion engine mode. The operator may move the control to each setting or position to control how the energy stored within the battery pack and the liquid fuel tank may be used to operate the vehicle traction drive(s). The gauges may provide feedback to the operator indicating how the energy sources are being consumed. If one of the fuel sources is depleting faster than the operator would like, the operator may adjust the control away from this source to use more energy from the other energy source.

For example, the operator control may be a dial attached to a potentiometer connected to engine controller 13. The potentiometer signal may be interpreted by the engine controller to command an actuator to manipulate the engine throttle to reach a desired engine speed. For example, the engine controller may interpret the potentiometer setting as a desired engine speed set point. The engine controller may adjust the throttle position to manage the engine speed through feed back from the magneto pulses. As engine speed increases, more power may be pulled off the engine by the generator and put out on the electrical bus for either charging the battery pack of providing power to the traction drive motor controller.

Alternatively, in another embodiment of the invention, the potentiometer reading may be provided to an additional controller. The additional controller may also be provided other information such as vehicle speed, accelerator pedal position, and/or remaining energy within the battery pack and/or fuel tank. The additional controller may use this information to determine the desired engine speed to provide to the engine controller.

In another alternative embodiment, operator control 38 also may be mechanically connected directly to the engine throttle through a cable. Additionally, a home switch for a controller or relay may be used to indicate when the home switch is in position for the battery-only mode, causing the controller to disable the internal combustion engine ignition. In this embodiment, the internal combustion engine may not be started unless the operator positions the control to open the home switch.

In another alternative embodiment, operator control 38 also may be connected by a cable to the engine throttle, and an ON/OFF/START key switch may be provided to indicate if the engine is running. In this embodiment, the operator may move the control to the OFF position to disable the traction drive, the ON position to enable operation of the traction drive in the battery-only mode while the engine is not running, and the START position as a momentary switch that cranks and starts the internal combustion engine for hybrid operation. The START position may also then be used turn the engine off and return the vehicle to battery-only mode.

Having described the preferred embodiment, it will become apparent that various modifications can be made without departing from the scope of the invention as defined in the accompanying claims.

The invention claimed is:

1. A user interface for energy sources on a hybrid vehicle, comprising:
    a battery pack energy level gauge indicating the state of charge relative to a capacity of a battery pack on the vehicle; and
    a liquid fuel tank energy level gauge indicating the fuel level available for an internal combustion engine connected to a generator on the vehicle;
    an operator control to operate a traction drive motor on the vehicle that an operator can move to control the relative amount of energy consumed by the motor from the battery pack energy source or from the generator.

2. The user interface for energy sources on a hybrid vehicle of claim 1 wherein the operator control changes the speed of the internal combustion engine.

3. The user interface for energy sources on a hybrid vehicle of claim 1 wherein the operator control changes the maximum speed of the internal combustion engine.

4. The user interface for energy sources on a hybrid vehicle of claim 1 further comprising an operator pedal to change the speed of the motor.

5. The user interface for energy sources on a hybrid vehicle of claim 4 wherein the operator pedal changes the speed of the internal combustion engine.

6. A user interface for energy sources on a hybrid vehicle, comprising:
    an operator control moveable between a first end setting where an internal combustion engine is disabled and an electric traction drive motor is provided energy only by a battery pack, and a second end setting where the electric traction drive motor is provided energy primarily by a generator connected to the internal combustion engine, and a plurality of intermediate positions between the end settings controlling the speed of the internal combustion engine to vary the amount of electrical energy consumed by the electric traction drive motor from the battery pack or from the generator.

7. The user interface for energy sources on a hybrid vehicle of claim 6 wherein each of the plurality of intermediate positions sets the maximum speed of the internal combustion engine.

8. The user interface for energy sources on a hybrid vehicle of claim 6 wherein the operator control is positioned on the user interface between an energy level gauge for the battery pack indicating the state of charge of the battery relative to a capacity of the battery pack, and an energy level gauge for a liquid fuel tank for the internal combustion engine.

9. The user interface for energy sources on a hybrid vehicle of claim 6 further comprising a throttle control connected to the internal combustion engine and a vehicle controller.

10. The user interface for energy sources on a hybrid vehicle of claim 6 further comprising a grid charger to charge the battery pack.

11. A user interface for energy sources on a hybrid vehicle, comprising:
    an operator control connected to a vehicle controller for an operator to select how much energy from each of a plurality of energy sources including a battery pack and an internal combustion engine connected to a generator to run an electrical traction drive motor of the vehicle; and
    a display adjacent the operator control showing how much energy remains in each of the plurality of energy sources.

12. The user interface for energy sources on a hybrid vehicle of claim 11 wherein the operator control may be positioned anywhere between a first end setting disabling one of the energy sources and a second end setting disabling another energy source.

13. The user interface for energy sources on a hybrid vehicle of claim 11 wherein one of the energy sources is a battery pack that is chargeable on a grid charger.

14. The user interface for energy sources on a hybrid vehicle of claim 13 wherein the battery pack controller updates the display of remaining energy in the battery pack based on charging and discharging information.

* * * * *